US010623881B2

(12) United States Patent
Freimann et al.

(10) Patent No.: US 10,623,881 B2
(45) Date of Patent: Apr. 14, 2020

(54) METHOD, COMPUTER READABLE STORAGE MEDIUM, AND APPARATUS FOR DETERMINING A TARGET SOUND SCENE AT A TARGET POSITION FROM TWO OR MORE SOURCE SOUND SCENES

(71) Applicant: INTERDIGITAL CE PATENT HOLDINGS, Paris (FR)

(72) Inventors: Achim Freimann, Hannover (DE); Jithin Zacharias, Darmstadt (DE); Peter Steinborn, Lehrte (DE); Ulrich Gries, Hannover (DE); Johannes Boehm, Goettingen (DE); Sven Kordon, Wunstorf (DE)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 15/432,874

(22) Filed: Feb. 14, 2017

(65) Prior Publication Data

US 2017/0245089 A1 Aug. 24, 2017

(30) Foreign Application Priority Data

Feb. 19, 2016 (EP) .................................... 16305200

(51) Int. Cl.
*G06F 17/00* (2019.01)
*H04S 7/00* (2006.01)

(52) U.S. Cl.
CPC ................ *H04S 7/302* (2013.01); *H04S 7/30* (2013.01); *H04S 2400/11* (2013.01); *H04S 2420/11* (2013.01)

(58) Field of Classification Search
CPC ........ H04S 7/302; H04S 7/30; H04S 2400/11; H04S 2420/11; G06F 3/165
See application file for complete search history.

(56) References Cited

U.S. PATENT DOCUMENTS 7,113,610 B1 * 9/2006 Chrysanthakopoulos .................. H04R 5/02 381/309
2010/0260355 A1 * 10/2010 Muraoka ................ A63F 13/10 381/107

(Continued)

FOREIGN PATENT DOCUMENTS

| | | |
|---|---|---|
| EP | 2182744 | 5/2010 |
| WO | WO2014001478 | 1/2014 |

OTHER PUBLICATIONS

Zhang et al., "Three Dimensional Sound Field Reproduction using Multiple Circular Loudspeaker Arrays: Functional Analysis Guided Approach", IEEE/ACM Transactions on Audio, Speech and Language Processing, vol. 22, No. 7, Jul. 2014, pp. 1184-1194.

*Primary Examiner* — Fan S Tsang
*Assistant Examiner* — David Siegel
(74) *Attorney, Agent, or Firm* — Jerome G Schaefer

(57) ABSTRACT

A method, a computer readable storage medium, and an apparatus for determining a target sound scene at a target position from two or more source sound scenes. A positioning unit positions spatial domain representations of the two or more source sound scenes in a virtual scene. These representations are represented by virtual loudspeaker positions. A projecting unit then obtains projected virtual loudspeaker positions of a spatial domain representation of the target sound scene by projecting the virtual loudspeaker positions of the two or more source sound scenes on a circle or a sphere around the target position.

13 Claims, 2 Drawing Sheets

(56) References Cited

U.S. PATENT DOCUMENTS

| | | | |
|---|---|---|---|
| 2013/0216070 A1 | 8/2013 | Keiler et al. | |
| 2014/0133660 A1 | 5/2014 | Jax et al. | |
| 2015/0230040 A1* | 8/2015 | Squires .................. | H04S 7/306 381/303 |
| 2015/0271621 A1 | 9/2015 | Sen et al. | |

* cited by examiner

METHOD, COMPUTER READABLE STORAGE MEDIUM, AND APPARATUS FOR DETERMINING A TARGET SOUND SCENE AT A TARGET POSITION FROM TWO OR MORE SOURCE SOUND SCENES

REFERENCE TO RELATED EUROPEAN APPLICATION

This application claims priority from European Application No. 16305200.4, entitled "METHOD, COMPUTER READABLE STORAGE MEDIUM, AND APPARATUS FOR DETERMINING A TARGET SOUND SCENE AT A TARGET POSITION FROM TWO OR MORE SOURCE SOUND SCENES", filed Feb. 19, 2016, the contents of which is hereby incorporated by reference in its entirety.

FIELD

The present solution relates to a method for determining a target sound scene at a target position from two or more source sound scenes. Further, the solution relates to a computer readable storage medium having stored therein instructions enabling determining a target sound scene at a target position from two or more source sound scenes. Furthermore, the solution relates to an apparatus configured to determine a target sound scene at a target position from two or more source sound scenes.

BACKGROUND 3D sound scenes, e.g. HOA recordings (HOA: Higher Order Ambisonics), deliver a realistic acoustical experience of a 3D sound field to users of virtual sound applications. However, moving within an HOA representation is a difficult task, as HOA representations of small orders are only valid in a very small region around one point in space.

Consider, for example, a user moving in a virtual reality scene from one acoustic scene into another acoustic scene, where the scenes are described by un-correlated HOA representations. The new scene should appear in front of the user as a sound object that gets wider as the user approaches the new scene until the scene finally surrounds the user when he has entered the new scene. The opposite should happen with the sound of the scene that the user is leaving. This sound should move more and more to the back of the user and finally, when the user enters the new scene, is converted into a sound object that gets narrower while the user is moving away from the scene.

One potential implementation for moving from one scene into the other would be a fading from one HOA representation to the other. However, this would not include the described spatial impressions of moving into a new scene that is in front of the user.

Therefore, a solution for moving from one sound scene to another sound scene is needed, which creates the described acoustic impression of moving into a new scene.

SUMMARY

According to one aspect, a method for determining a target sound scene at a target position from two or more source sound scenes comprises:

positioning spatial domain representations of the two or more source sound scenes in a virtual scene, the representations being represented by virtual loudspeaker positions; and determining projected virtual loudspeaker positions of a spatial domain representation of the target sound scene by projecting the virtual loudspeaker positions of the two or more source sound scenes on a circle or a sphere around the target position.

Similarly, a computer readable storage medium has stored therein instructions enabling determining a target sound scene at a target position from two or more source sound scenes, wherein the instructions, when executed by a computer, cause the computer to:

position spatial domain representations of the two or more source sound scenes in a virtual scene, the representations being represented by virtual loudspeaker positions; and obtain projected virtual loudspeaker positions of a spatial domain representation of the target sound scene by projecting the virtual loudspeaker positions of the two or more source sound scenes on a circle or a sphere around the target position.

Also, in one embodiment an apparatus configured to determine a target sound scene at a target position from two or more source sound scenes comprises:

a positioning unit configured to position spatial domain representations of the two or more source sound scenes in a virtual scene, the representations being represented by virtual loudspeaker positions; and a projecting unit configured to obtain projected virtual loudspeaker positions of a spatial domain representation of the target sound scene by projecting the virtual loudspeaker positions of the two or more source sound scenes on a circle or a sphere around the target position.

In another embodiment, an apparatus configured to determine a target sound scene at a target position from two or more source sound scenes comprises a processing device and a memory device having stored therein instructions, which, when executed by the processing device, cause the apparatus to:

position spatial domain representations of the two or more source sound scenes in a virtual scene, the representations being represented by virtual loudspeaker positions; and obtain projected virtual loudspeaker positions of a spatial domain representation of the target sound scene by projecting the virtual loudspeaker positions of the two or more source sound scenes on a circle or a sphere around the target position. HOA representations or other types of sound scenes from sound field recordings can be used in virtual sound scenes or virtual reality applications to create a realistic 3D sound. However, HOA representations are only valid for one point in space so that moving from one virtual sound scene or virtual reality scene to another is a difficult task. As a solution the present application computes a new HOA representation for a given target position, e.g. a current user position, from several HOA representations, where each describes the sound field of different scenes. In this way the relative arrangement of the user position with regard to the HOA representations is used to manipulate the representation by applying a spatial warping.

In one embodiment, directions between the target position and the obtained projected virtual loudspeaker positions are obtained and a mode-matrix is computed from the obtained directions. The mode-matrix consists of coefficients of spherical harmonics functions for the directions. The target sound scene is created by multiplying the mode-matrix by a matrix of corresponding weighted virtual loudspeaker signals. The weighting of a virtual loudspeaker signal preferably is inversely proportional to a distance between the target position and the respective virtual loudspeaker or a point of origin of the spatial domain representation of the respective source sound scene. In other words, the HOA representations are mixed into a new HOA representation for the target position. During this process mixing gains are applied, which are inversely proportional to the distances of the target position to the point of origin of each HOA representation.

In one embodiment, a spatial domain representation of a source sound scene or a virtual loudspeaker beyond a certain distance to the target position are neglected when determining the projected virtual loudspeaker positions. This allows reducing the computational complexity and removing the sound of scenes that are far away from the target position.

DETAILED DESCRIPTION OF PREFERRED EMBODIMENTS

Figure 1:
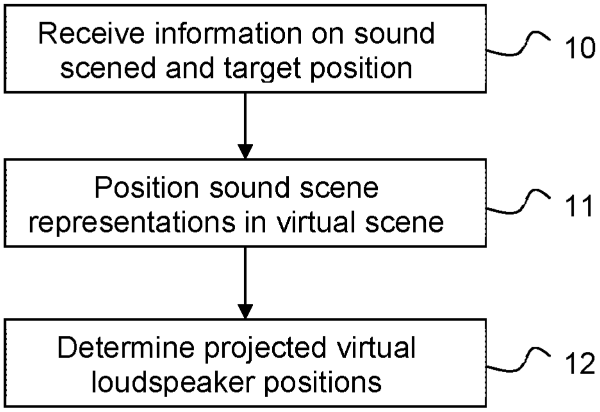
FIG. 1 is a simplified flow chart illustrating a method for determining a target sound scene at a target position from two or more source sound scenes.

For a better understanding the principles of embodiments of the invention shall now be explained in more detail in the following description with reference to the figures. It is understood that the invention is not limited to these exemplary embodiments and that specified features can also expediently be combined and/or modified without departing from the scope of the present invention as defined in the appended claims. In the drawings, the same or similar types of elements or respectively corresponding parts are provided with the same reference numbers in order to prevent the item from needing to be reintroduced.

FIG. 1 depicts a simplified flow chart illustrating a method for determining a target sound scene at a target position from two or more source sound scenes. First information on the two or more source sound scenes and the target position is received 10. Then spatial domain representations of the two or more source sound scenes are positioned 11 in a virtual scene, where these representations are represented by virtual loudspeaker positions. Subsequently projected virtual loudspeaker positions of a spatial domain representation of the target sound scene are obtained 12 by projecting the virtual loudspeaker positions of the two or more source sound scenes on a circle or a sphere around the target position.

Figure 2:
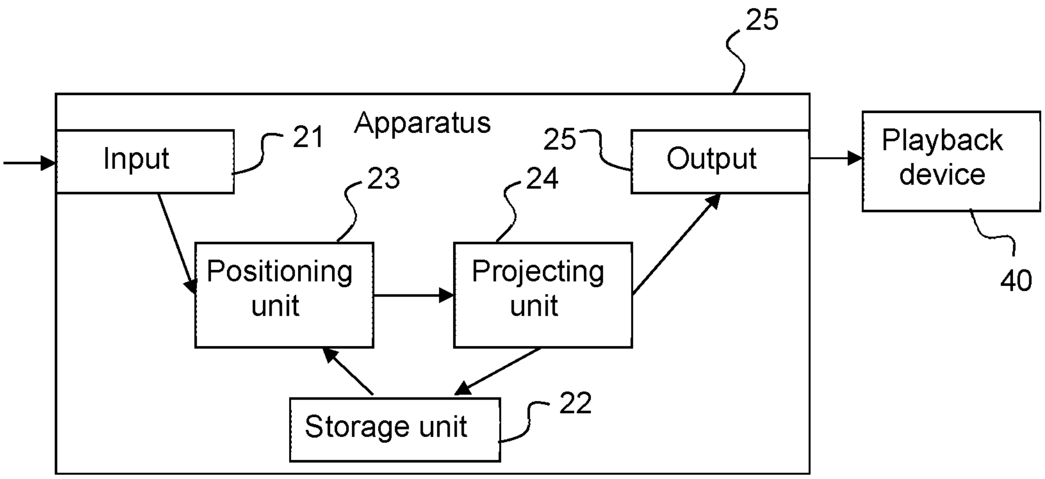
FIG. 2 schematically depicts a first embodiment of an apparatus configured to determine a target sound scene at a target position from two or more source sound scenes.

FIG. 2 shows a simplified schematic illustration of an apparatus configured to determine a target sound scene at a target position from two or more source sound scenes. The apparatus 20 has an input 21 for receiving information on the two or more source sound scenes and the target position. Alternatively, information on the two or more source sound scenes is retrieved from a storage unit 22. The apparatus 20 further has a positioning unit 23 for positioning 11 spatial domain representations of the two or more source sound scenes in a virtual scene. These representations are represented by virtual loudspeaker positions. A projecting unit 24 obtains 12 projected virtual loudspeaker positions of a spatial domain representation of the target sound scene by projecting the virtual loudspeaker positions of the two or more source sound scenes on a circle or a sphere around the target position. The output generated by the projecting unit 24 is made available via an output 25 for further processing, e.g. for a playback device 40 that reproduces virtual sources at the projected target positions to the user. In addition, it may be stored on the storage unit 22. The output 25 may also be combined with the input 21 into a single bidirectional interface. The positioning unit 23 and projecting unit 24 can be embodied as dedicated hardware, e.g. as an integrated circuit. Of course, they may likewise be combined into a single unit or implemented as software running on a suitable processor. In FIG. 2, the apparatus 20 is coupled to the playback device 40 using a wireless or a wired connection. However, the apparatus 20 may also be an integral part of the playback device 40.

Figure 3:
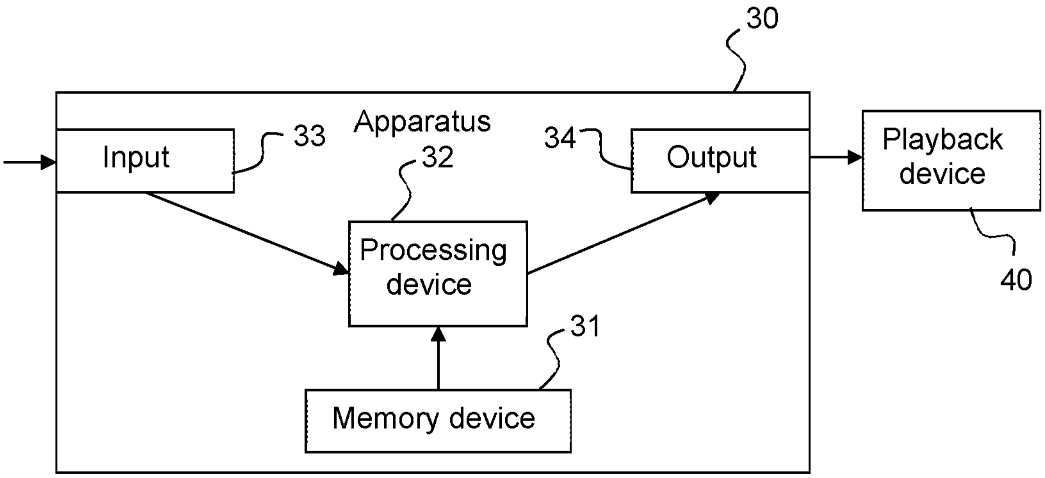
FIG. 3 schematically shows a second embodiment of an apparatus configured to determine a target sound scene at a target position from two or more source sound scenes.

In FIG. 3, there is another apparatus 30 configured to determine a target sound scene at a target position from two or more source sound scenes. The apparatus 30 comprises a processing device 32 and a memory device 31. The apparatus 30 is for example a computer or workstation. The memory device 31 has stored therein instructions, which, when executed by the processing device 32, cause the apparatus 30 to perform steps according to one of the described methods. As before, information on the two or more source sound scenes and the target position are received via an input 33. Position information generated by the processing device 31 is made available via an output 34. In addition, it may be stored on the memory device 31. The output 34 may also be combined with the input 33 into a single bidirectional interface.

For example, the processing device 32 can be a processor adapted to perform the steps according to one of the described methods. In an embodiment said adaptation comprises that the processor is configured, e.g. programmed, to perform steps according to one of the described methods.

A processor as used herein may include one or more processing units, such as microprocessors, digital signal processors, or combination thereof.

The storage unit 22 and the memory device 31 may include volatile and/or non-volatile memory regions and storage devices such as hard disk drives, DVD drives, and solid-state storage devices. A part of the memory is a non-transitory program storage device readable by the processing device 32, tangibly embodying a program of instructions executable by the processing device 32 to perform program steps as described herein according to the principles of the invention.

In the following further implementation details and applications shall be described. By way of example a scenario is considered where a user can move from one virtual acoustical scene to another. The sound, which is played back to the listener via a headset or a 3D or 2D loudspeaker layout, is composed from the HOA representations of each scene dependent on the position of the user. These HOA representations are of limited order and represent a 2D or 3D sound field that is valid for a specific region of the scene. The HOA representations are assumed to describe completely different scenes.

The above scenario can be used for virtual reality applications, like for example computer games, virtual reality worlds like “Second Life” or sound installations for all kind of exhibitions. In the latter example the visitor of the exhibition could wear a headset comprising a position tracker so that the audio can be adapted to the shown scene and to the position of the listener. One example could be a zoo, where the sound is adapted to the natural environment of each animal to enrich the acoustical experience of the visitor.

For the technical implementation the HOA representation is represented in the equivalent spatial domain representation. This representation consists of virtual loudspeaker signals, where the number of signals is equal to the number of HOA coefficients of the HOA representation. The virtual loudspeaker signals are obtained by rendering the HOA representation to an optimal loudspeaker layout for the corresponding HOA order and dimension. The number of virtual loudspeakers has to be equal to the number of HOA coefficients and the loudspeakers are uniformly distributed on a circle for 2D representations and on a sphere for 3D representations. The radius of the sphere or the circle can be ignored for the rendering. For the following description of the proposed solution a 2D representation is used for simplicity. However, the solution also applies to 3D representations by exchanging the virtual loudspeaker positions on a circle with the corresponding positions on a sphere.

Figure 4:
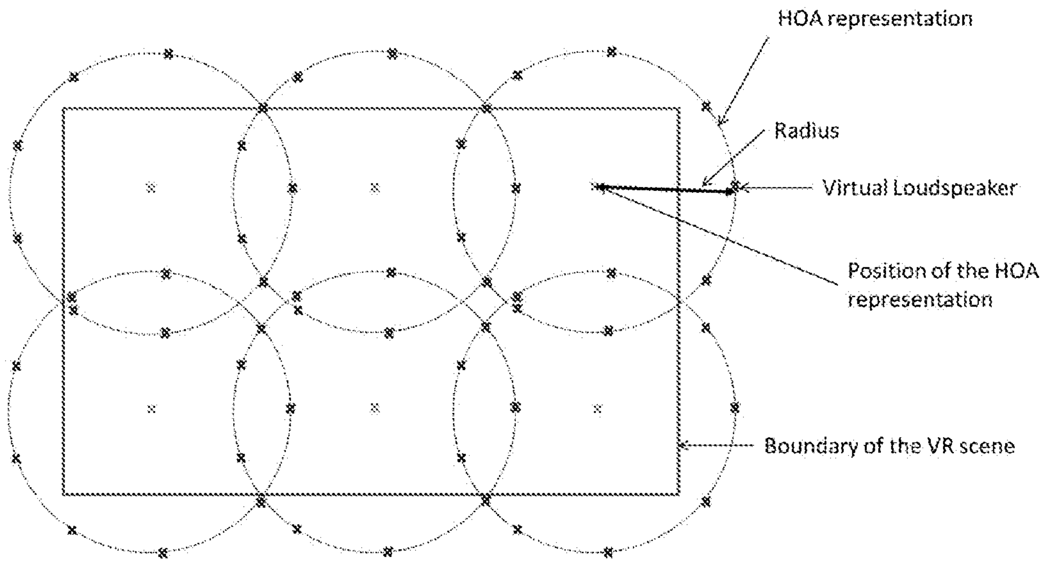
FIG. 4 illustrates exemplary HOA representations in a virtual reality scene.

In a first step the HOA representations have to be positioned in the virtual scene. To this end each HOA representation is represented by the virtual loudspeakers of its spatial domain representation, where the center of the circle or sphere defines the position of the HOA representation and the radius defines the local spread of the HOA representation. A 2D example for six representations is given in FIG. 4.

Figure 5:
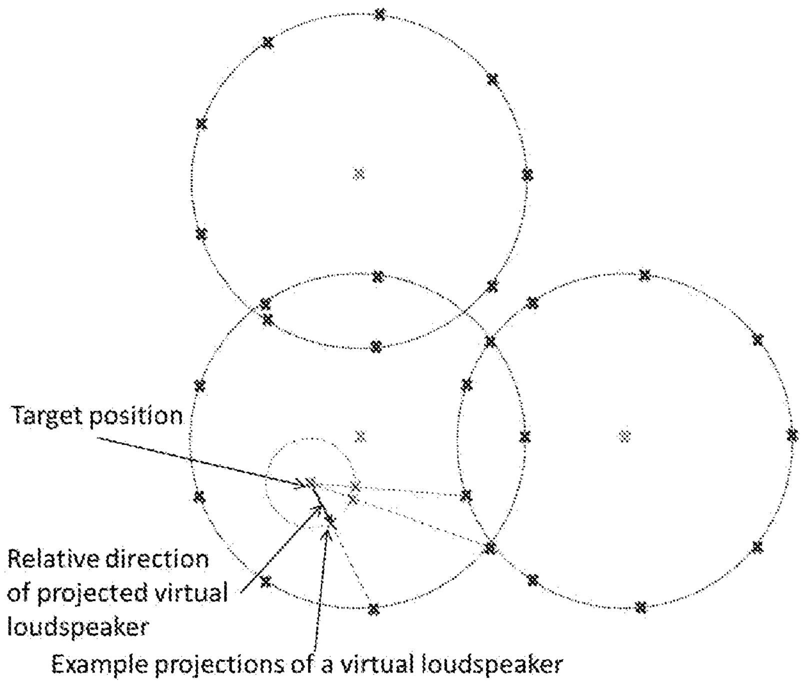
FIG. 5 depicts computation of a new HOA representation at a target position.

The virtual loudspeaker positions of the target HOA representation are computed by a projection of the virtual loudspeaker positions of all HOA representations on the circle or sphere around the current user position, where the current user position is the point of origin of the new HOA representation. In FIG. 5 an exemplary projection for three virtual loudspeakers on a circle around the target position is depicted.

From the directions measured between the user position and the projected virtual loudspeaker positions, see FIG. 5, a so-called mode-matrix is computed, which consists of the coefficients of spherical harmonics functions for these directions. The multiplication of the mode-matrix by a matrix of the corresponding weighted virtual loudspeaker signals creates a new HOA representation for the user position. The weighting of the loudspeaker signals is preferably selected inversely proportional to the distance between the user position and the virtual loudspeaker or the point of origin of the corresponding HOA representation. A rotation of the user's head into a certain direction can then be taken into account by a rotation of the newly created HOA representation into the opposite direction. The projection of the virtual loudspeakers of several HOA representations on a sphere or circle around the target position can also be understood as a spatial warping of an HOA representation.

To overcome the issue of unsteady successive HOA representations, advantageously a crossfade between the HOA representations computed from the previous and the current mode-matrix and weights using the current virtual loudspeaker signals is applied.

Furthermore, it is possible to ignore HOA representations or virtual loudspeakers beyond a certain distance to the target position in the computation of the target HOA representation. This allows reducing the computational complexity and removing the sound of scenes that are far away from the target position.

As the warping effect might impair the accuracy of the HOA representation, optionally the proposed solution is only used for the transition from one scene to another. Thus an HOA-only region given by a circle or sphere around the center of an HOA representation is defined in which the warping or computation of a new target position is disabled. In this region the sound is only reproduced from the closest HOA representation without any modifications of the virtual loudspeaker positions to ensure a stable sound impression. However, in this case the playback of the HOA representation is unsteady when the user leaves the HOA-only region. At this point the positions of the virtual speakers would jump suddenly to the warped positions, which might sound unsteady. Therefore, a correction of the target position, the radius and location of the HOA representations is preferably applied to start the warping steadily at the boundary of the HOA-only regions to overcome this issue.

The invention claimed is:

1. A method for determining a target sound scene representation at a target position from two or more source sound scenes, the method comprising:

positioning spatial domain representations of the two or more source sound scenes in a virtual scene, the representations being represented by virtual loudspeaker positions, wherein each of the two or more source sound scenes are different scenes having different sound fields;

obtaining projected virtual loudspeaker positions of a spatial domain representation of the target sound scene by projecting, in the direction of said target position, the virtual loudspeaker positions of the two or more source sound scenes on a circle or a sphere around the target position;

obtaining said target sound scene representation from directions measured between the target position and the projected virtual loudspeaker positions;

determining directions between the target position and the obtained projected virtual loudspeaker positions; and computing a mode-matrix from the directions wherein the mode-matrix comprises coefficients of spherical harmonics functions for the directions.

2. The method according to claim 1, wherein the target sound scene and the source sound scenes are higher order ambisonics (HOA) scenes.

3. The method according to claim 1, wherein the target position is a current user position.

4. The method according to claim 1, wherein the target sound scene is created by multiplying the mode-matrix by a matrix of corresponding weighted virtual loudspeaker signals.

5. The method according to claim 4, wherein the weighting of a virtual loudspeaker signal is inversely proportional to a distance between the target position and the virtual loudspeaker or a point of origin of the spatial domain representation of the source sound scene.

6. The method according to claim 1, wherein a spatial domain representation of a source sound scene or a virtual loudspeaker beyond a certain distance to the target position are neglected when obtaining the projected virtual loudspeaker positions.

7. An apparatus configured to determine a target sound scene at a target position from two or more source sound scenes, the apparatus comprising:

a positioning unit configured to position spatial domain representations of the two or more source sound scenes in a virtual scene, wherein each of the two or more source sound scenes are different scenes having different sound fields, and wherein the representations are represented by virtual loudspeaker positions; and a projecting unit configured to obtain projected virtual loudspeaker positions of a spatial domain representation of the target sound scene by projecting the virtual loudspeaker positions of the two or more source sound scenes on a circle or a sphere around the target position;

a processor configured to determine directions between the target position and the projected virtual loudspeaker positions, and compute a mode-matrix from the directions, wherein the mode-matrix comprises coefficients of spherical harmonics functions for the directions.

8. The apparatus according to claim 7, wherein the target sound scene and the source sound scenes are higher order ambisonics (HOA) scenes.

9. The apparatus according to claim 7, wherein the target position is a current user position.

10. The apparatus according to claim 7, wherein the target sound scene is created by multiplying the mode-matrix by a matrix of corresponding weighted virtual loudspeaker signals.

11. The apparatus according to claim 10, wherein the weighting of a virtual loudspeaker signal is inversely proportional to a distance between the target position and the virtual loudspeaker or a point of origin of the spatial domain representation of the source sound scene.

12. The apparatus according to claim 7, wherein a spatial domain representation of a source sound scene or a virtual loudspeaker beyond a certain distance to the target position are neglected when obtaining the projected virtual loudspeaker positions.

13. A non-transitory computer readable storage medium having stored therein instructions enabling determining a target sound scene at a target position from two or more source sound scenes, wherein the instructions, when executed by a computer, cause the computer to perform the method according to claim 1.

* * * * *